United States Patent
Hofer et al.

(10) Patent No.: US 12,434,290 B2
(45) Date of Patent: Oct. 7, 2025

(54) CONVEYING DEVICE AND METHOD FOR CONVEYING METAL STRIP COILS

(71) Applicant: Primetals Technologies Austria GmbH, Linz (AT)

(72) Inventors: Roland Hofer, Reichenau im Muehlkreis (AT); Lukas Pichler, Linz (AT); Christoph Salzmann, Linz (AT)

(73) Assignee: Primetals Technologies Austria GmbH, Linz (AT)

( * ) Notice: Subject to any disclaimer, the term of this patent is extended or adjusted under 35 U.S.C. 154(b) by 0 days.

(21) Appl. No.: 18/713,301

(22) PCT Filed: Nov. 30, 2022

(86) PCT No.: PCT/EP2022/083820
§ 371 (c)(1),
(2) Date: May 24, 2024

(87) PCT Pub. No.: WO2023/099548
PCT Pub. Date: Jun. 8, 2023

(65) Prior Publication Data
US 2025/0018457 A1    Jan. 16, 2025

(30) Foreign Application Priority Data
Dec. 2, 2021  (EP) .................................. 21211936

(51) Int. Cl.
*B21D 43/00*    (2006.01)
(52) U.S. Cl.
CPC .................. *B21D 43/006* (2013.01)
(58) Field of Classification Search
CPC ............... B65G 47/56; B65G 47/57; B65G 2201/0232; B65G 2203/0266; B65G 35/06; B21D 43/006
(Continued)

(56) References Cited

U.S. PATENT DOCUMENTS 3,032,289 A * 5/1962 Fredriksson .............. B21B 1/30
72/252
3,173,554 A * 3/1965 Ebbert ................... B65G 47/54
198/463.3

(Continued)

FOREIGN PATENT DOCUMENTS

CN       203170698 U    9/2013
EP        1648626 B1   11/2007
(Continued)

OTHER PUBLICATIONS

International Search Report and Written Opinion received in International Application No. PCT/EP2022/083820 dated Apr. 14, 2023, 26 pages.

(Continued)

*Primary Examiner* — Gregory W Adams
(74) *Attorney, Agent, or Firm* — Liang & Hennessey LLP; Brian Hennessey (57) ABSTRACT

A conveying device for conveying metal strip coils. The conveying device includes: at least one coil carrier to carry a metal strip coil; two conveying stations arranged at different heights and each designed to receive one coil carrier; and a conveyor track extending between the conveying stations and having a conveyor drive by means of which a coil carrier can be conveyed on the conveyor track between the conveying stations. Each conveying station is tiltable between a first end position in which the conveying station is oriented horizontally and a second end position, wherein the conveying station has an inclination in the second end position which corresponds to the inclination of the conveyor track and adjoins the conveyor track so that a coil carrier can be conveyed by means of the conveyor drive from the conveyor track into the conveying station and from the conveying station onto the conveyor track.

17 Claims, 5 Drawing Sheets

(58) Field of Classification Search
USPC .............. 414/684; 242/533.8, 559; 198/589, 198/369.1, 369.2, 586, 465.1, 345.3, 198/803.2; 104/88.01, 88.03, 128, 172.2, 104/172.3
See application file for complete search history.

(56) References Cited

U.S. PATENT DOCUMENTS

| | | | | |
|---|---|---|---|---|
| 4,793,460 A * | 12/1988 | Cunico | ............... | B65G 1/06 198/465.1 |
| 5,090,555 A * | 2/1992 | Kura | ............... | B65G 35/06 198/465.1 |
| 5,213,467 A * | 5/1993 | Harms | ............... | B65G 25/02 414/535 |
| 6,186,724 B1 * | 2/2001 | Hollander | ............... | B65G 1/08 414/273 |
| 6,644,210 B1 * | 11/2003 | Pfleger | ............... | B66B 31/006 104/162 |
| 7,299,673 B2 | 11/2007 | Zieser et al. | | |
| 8,297,430 B2 * | 10/2012 | Van Den Goor | ... | B65G 47/844 198/375 |
| 8,424,672 B2 * | 4/2013 | Kim | ............... | B65G 1/04 198/465.2 |
| 8,727,261 B2 * | 5/2014 | Enwald | ............... | B65H 19/30 242/560 |
| 8,833,263 B2 * | 9/2014 | Fanshawe | ............... | B61B 13/04 104/118 |
| 9,221,482 B2 | 12/2015 | Gatterbauer et al. | | |
| 9,802,231 B2 | 10/2017 | Fuchs et al. | | |
| 9,878,857 B2 * | 1/2018 | Itoh | ............... | B65G 15/12 |
| 2006/0070847 A1 * | 4/2006 | Besch | ............... | B65G 1/0492 198/347.4 |
| 2010/0084245 A1 * | 4/2010 | Gonzalez Alemany | ............... | B65G 23/16 198/465.1 |
| 2020/0087080 A1 | 3/2020 | Becher et al. | | |
| 2021/0155413 A1 * | 5/2021 | Pakkanen | ............... | B65G 47/54 |

FOREIGN PATENT DOCUMENTS

| | | |
|---|---|---|
| EP | 2629899 B1 | 11/2014 |
| JP | S5393887 U | 7/1978 |
| JP | S61206510 A | 9/1986 |
| JP | H0614134 U | 2/1994 |
| WO | 2010084011 A1 | 7/2010 |
| WO | WO-2019211525 A1 * | 11/2019 ............. B65B 35/30 |

OTHER PUBLICATIONS

European Search Report received in European Application No. 21211936.6 dated May 9, 2022, 18 pages.

* cited by examiner

CONVEYING DEVICE AND METHOD FOR CONVEYING METAL STRIP COILS

CROSS-REFERENCE TO RELATED APPLICATIONS

The present application is a national phase application of PCT Application No. PCT/EP2022/083820, filed Nov. 30, 2022, entitled "CONVEYING DEVICE AND METHOD FOR CONVEYING METAL STRIP COILS", which claims the benefit of European Patent Application No. 21211936.6, filed Dec. 2, 2021, each of which is incorporated by reference in its entirety.

BACKGROUND OF THE INVENTION

1. Field of the Invention

The invention relates to a transport device for transporting metal strip coils, and to a method for operating the transport device.

2. Description of the Related Art

A metal strip coil refers to a metal strip that has been wound up. Metal strip coils are produced in particular in rolling mills, in which metal strips are rolled and are subsequently wound up using a coiler to form metal strip coils in order to be transported. Such metal coils may for example have coil weights of up to approximately 45 tonnes and diameters of up to approximately 2 meters. It is commonly necessary for the metal strip coils, after being wound up, to be moved to a different height level, for example in order to be stored in a coil store. To overcome the height difference, use may for example be made of a lifting device such as a lift or a lifting platform. The installation of such a lifting device however requires a sufficient amount of space, which is often not available, in particular in existing plants. Furthermore, a lifting device interrupts a continuous transport of the metal strip coils. The interruption of the transport represents a safety problem because, at the interruption point, it is necessary for the metal strip coils to be transferred, leading to the risk of metal strip coils falling. The lifting of the metal strip coils by means of a lifting device can furthermore be relatively time-consuming, because the metal strip coils have to be moved consecutively by means of the lifting device to the different height level. This can lead to delays in the production process.

SUMMARY OF THE INVENTION

It is the object of the invention to allow continuous, that is to say transfer-free, transport of metal strip coils between different height levels.

The object is achieved according to the invention by means of a transport device having the features of the claims and a method having the features of the claims.

The subclaims relate to advantageous refinements of the invention.

A transport device according to the invention for transporting metal strip coils comprises:
  at least one coil carrier that is configured for carrying a metal strip coil,
  two conveying stations which are arranged at mutually different heights and which are each configured for receiving a coil carrier, and
  a conveying track that runs between the conveying stations,
  a conveying drive by means of which a coil carrier can be conveyed on the conveying track between the conveying stations,
  wherein each conveying station can be tilted between a first end position, in which the conveying station is oriented horizontally, and a second end position, wherein the conveying station, in the second end position, has an inclination corresponding to the gradient of the conveying track and adjoins the conveying track such that a coil carrier can be conveyed by the conveying drive from the conveying track into the conveying station and out of the conveying station onto the conveying track.

A transport device according to the invention allows continuous, that is to say transfer-free, and therefore safe, transport of metal strip coils between two different height levels. For this purpose, the transport device has a conveying track which runs between the two height levels and which is therefore inclined, and on which coil carriers that can be loaded with in each case one metal strip coil can be conveyed. The transport device furthermore has, at each of the two height levels, a conveying station in which in each case one coil carrier can be received. Each conveying station can be tilted from a horizontal first end position into a second end position, which corresponds to the gradient of the conveying track. In the first end position of a conveying station, a coil carrier that is being supplied to the transport device can be moved into the conveying station, or a coil carrier that is being transported by the transport device can be moved out of the conveying station. In the second end position of a conveying station, a coil carrier can be conveyed out of the conveying station onto the conveying track and from the conveying track into the conveying station.

As well as allowing transfer-free transport of metal strip coils, the transport device furthermore allows multiple coil carriers to be transported simultaneously on the conveying track. It is thus possible for multiple coil carriers loaded with in each case one metal strip coil to be conveyed simultaneously on the conveying track from a first conveying station to the second conveying station. This advantageously allows a high throughput of metal strip coils that are transported by means of the transport device. Furthermore, after the coil carriers have been unloaded, it is at the same time conversely possible for multiple unloaded coil carriers to be conveyed on the conveying track back to the first conveying track.

A further advantage of a transport device according to the invention arises in existing plants that already have a conveying track suitable for transporting metal strip coils. Under some circumstances, such a conveying track can advantageously be relatively easily expanded to form a transport device according to the invention, by virtue of a conveying station being arranged at each of its ends.

In one refinement of the invention, each conveying station has a tilting drive, for example a hydraulic drive, for tilting the conveying station between the two end positions. This refinement of the invention allows for the fact that metal strip coils generally have a high mass.

In a further refinement of the invention, each conveying station has an arresting mechanism by means of which a coil carrier can be arrested in the conveying station. For example, each arresting mechanism has at least one arresting element which can be pivoted between two pivoting positions, which in a first pivoting position is decoupled from a coil carrier received in the conveying station, and which in a second pivoting position is set against the coil carrier. Furthermore, each arresting mechanism can have, for each arresting element, a pivoting drive, for example a hydraulic drive, by means of which the arresting element can be pivoted between the two pivoting positions. These refinements of the invention advantageously allow a coil carrier to be secured in a conveying station so as to be prevented from sliding out of the conveying station. This is important in particular if the conveying station is tilted whilst a coil carrier is situated in the conveying station, because there is the risk here of the coil carrier sliding downward in the inclined conveying station owing to gravitational force. Since specifically a loaded coil carrier generally has a high mass, an arresting element that can be pivoted by means of a pivoting drive is particularly suitable for arresting a coil carrier in a conveying station.

In a further refinement of the invention, the conveying drive has a traction mechanism drive having a traction mechanism that runs along the conveying track, and each coil carrier can be coupled to the traction mechanism. The traction mechanism is for example a chain, a belt or a cable. For example, the traction mechanism has at least one driver element, and each coil carrier has a coupling element which can be coupled to a driver element of the traction mechanism. Each driver element has, for example, a recess for the coupling element of a coil carrier, and the coupling element is received in the recess of a driver element of the traction mechanism when said coupling element is coupled to the traction mechanism. Such conveying drives having a traction mechanism are advantageously relatively inexpensive, robust and low-maintenance.

In an alternative refinement of the invention, the conveying drive has not a traction mechanism drive but a support element which runs along the conveying track and to which the coil carrier can be coupled by means of at least one engagement element. The support element may be designed as a pin rack or as a toothed rack, and is fixed to the conveying track. The at least one engagement element is for example designed as a toothed gear and arranged on the coil carrier, and engages interlockingly into the support element when the coil carrier is in the coupled state. For movement purposes, each coil carrier has at least one drive device (for example an electric motor) for the at least one engagement element. By contrast to the refinement mentioned above, the conveying drive in this refinement has not a 'central' drive (in the form of a driven traction mechanism) but a 'central' support element for a plurality of coil carriers, wherein each coil carrier comprises at least one dedicated drive device.

This refinement of the conveying drive having a central support element and 'decentralized' drive units on each coil carrier advantageously exhibits increased robustness because-by contrast, for example, to a traction mechanism running along the conveying track—the movable elements of the drive (for example motor shaft, toothed gear) are arranged in structurally compact form on the respective coil carriers and are protected by these against mechanical influences. In particular, a support element designed as a pin rack also exhibits low susceptibility to contamination—for example in the presence of a high dust load—because the pins of a pin rack are mutually spaced with a predefined normal spacing with respect to the conveying track of for example 10 to 20 cm. During the movement of a coil carrier, the at least one engagement element is in operative engagement—for example by way of the flanks of a driven toothed gear—with the pins, running transversely with respect to the direction of travel, of the pin rack.

In a further refinement of the invention, each coil carrier is configured to carry a metal strip coil such that, during the transport on the conveying track, a coil axis of the metal strip coil is oriented horizontally and perpendicularly with respect to a transport direction during the transport. For example, each coil carrier has two mutually spaced bearing surfaces for a circumferential outer surface of a metal strip coil, wherein the two bearing surfaces of each coil carrier are preferably inclined with respect to one another. Such support of a metal strip coil on a coil carrier advantageously prevents damage from being caused to the metal strip coil, in particular to strip edges of the metal strip coil, during the transport. Such damage may occur for example when transporting a metal strip coil with a coil axis oriented vertically rather than horizontally, if, in this case, strip edges of the metal strip coil lie on a surface.

In a further refinement of the invention, the conveying track and the conveying stations have mutually corresponding rails, and each coil carrier has wheels corresponding to the rails. Such rails allow the coil carrier to be guided on the conveying track and in the conveying stations and, in particular in the second end position of the conveying station, allow the coil carrier to be easily conveyed out of the conveying station onto the conveying track and from the conveying track into the conveying station.

In a further refinement of the invention, each coil carrier has a brake for braking a movement of the coil carrier. In this way, a coil carrier can be braked if necessary, in particular also in order to prevent it from sliding out of an inclined conveying station, for example if an aforementioned arresting mechanism of the conveying station is not present or fails.

In a further refinement, the transport device has a control unit that is configured to control the tilting of the conveying stations and to control the conveying drive. The control unit may furthermore be configured to also control the arresting mechanisms of the conveying stations, or the pivoting drives of said arresting mechanisms. In particular, the control unit can coordinate the tilting of the conveying stations, the arresting of coil carriers in the conveying stations, and the conveyance of coil carriers on the conveying track and between the conveying track and the conveying stations.

In the method according to the invention for operating a transport device according to the invention, a coil carrier is firstly loaded with a metal strip coil. The loaded coil carrier is subsequently moved to a first conveying station and received by the first conveying station in the first end position of said first conveying station. The first conveying station is subsequently tilted into the second end position. The loaded coil carrier is subsequently coupled to the conveying drive and conveyed by means of the conveying drive out of the first conveying station onto the conveying track and, on the conveying track, to the second conveying station. In the context of the invention, 'coupling to the conveying drive' means either that a coil carrier is coupled to a traction mechanism of the conveying drive or that an engagement element arranged on the coil carrier is interlockingly operatively connected to the support element of the conveying drive. The loaded coil carrier is subsequently conveyed by the conveying drive into the second conveying station, and received in the second conveying station, in the second end position of the second conveying station. The second conveying station with the loaded coil carrier is subsequently tilted into the first end position. Finally, the loaded coil carrier is moved out of the second conveying station.

BRIEF DESCRIPTION OF THE DRAWINGS

The above-described properties, features and advantages of this invention, and the manner in which these are achieved, will become clearer and easier to understand in conjunction with the following description of exemplary embodiments, which will be discussed in more detail in conjunction with the drawings. In the drawings.

DETAILED DESCRIPTION

In the figures, mutually corresponding parts are denoted by the same reference designations.

The figures show an exemplary embodiment of a transport device 1 for transporting metal strip coils 2 in schematic illustrations, from which details that are not relevant to the invention have been omitted. The transport device 1 comprises at least one coil carrier 3 that is configured for carrying a metal strip coil 2, two conveying stations 4, 5 that are arranged at mutually different heights and are each configured for receiving a coil carrier 3, a conveying track 6 that runs between the conveying stations 4, 5 and has a conveying drive 7 by means of which a coil carrier 3 can be conveyed on the conveying track 6 between the conveying stations 4, 5, and a control unit 8.

Figure 1A:
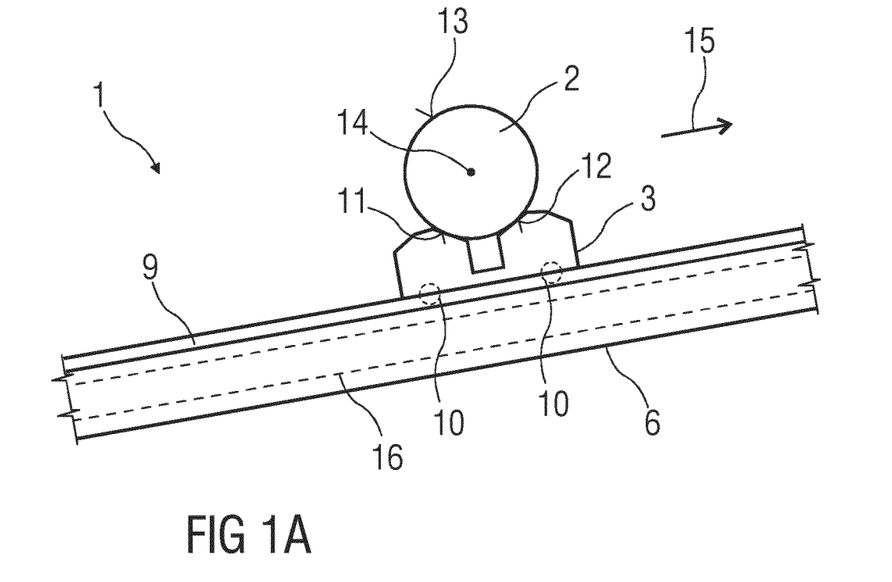
FIG. 1A shows a conveying track of a first exemplary embodiment of a transport device, and a coil carrier that is being conveyed on the conveying track.

FIG. 1A (FIG. 1A) shows the conveying track 6 and a coil carrier 3 which has been loaded with a metal strip coil 2 and which is being conveyed on the conveying track 6. The conveying track 6 has a gradient in order to overcome the height difference between the conveying stations 4, 5. The conveying track 6 has rails 9 on which the coil carrier 3 is guided. The coil carrier 3 has wheels 10 that correspond to the rails 9. The coil carrier 3 furthermore has two mutually spaced bearing surfaces 11, 12 which are inclined with respect to one another and on which a circumferential outer surface 13 of the metal strip coil 2 is supported, such that, during the transport on the conveying track 6, a coil axis 14 of the metal strip coil 2 is oriented horizontally and perpendicularly with respect to a transport direction 15 of the transport. The conveying drive 7 has a traction mechanism drive having a traction mechanism 16 which runs along the conveying track 6 below the rails 9 and to which the coil carrier 3 is coupled during the transport on the conveying track 6.

Figure 1B:
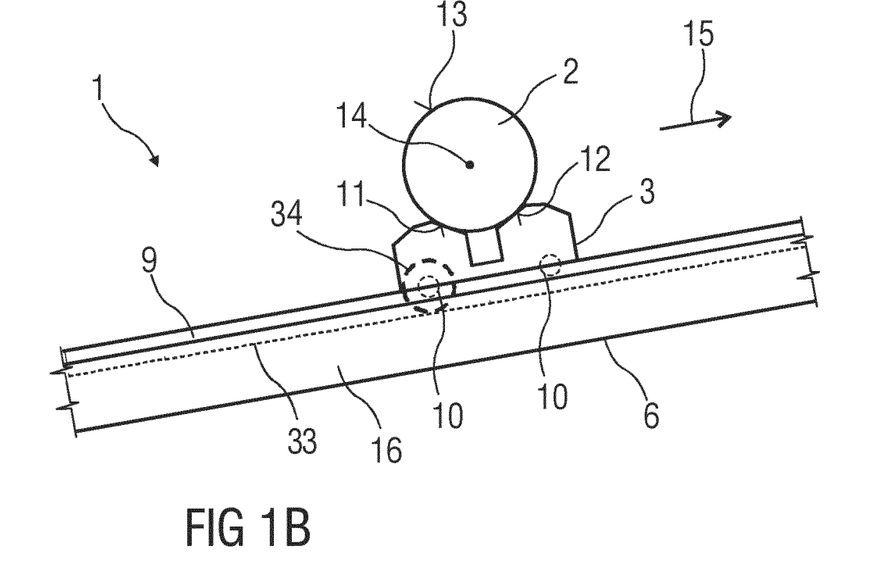
FIG. 1B shows a conveying track of a second exemplary embodiment of a transport device, and a coil carrier that is being conveyed on the conveying track.

The exemplary embodiment illustrated in FIG. 1B (FIG. 1B) differs from that in FIG. 1A merely by the design of the conveying drive 7: a support element 33, for example in the form of a pin rack or a toothed rack, runs along the conveying track 6. In order to move the coil carrier 3, the engagement element 34—for example a toothed gear that is driven by means of a drive device (not illustrated in FIG. 1B) arranged on the coil carrier 3—engages interlockingly into the support element 33—for example a pin rack or a toothed rack.

Figure 2:
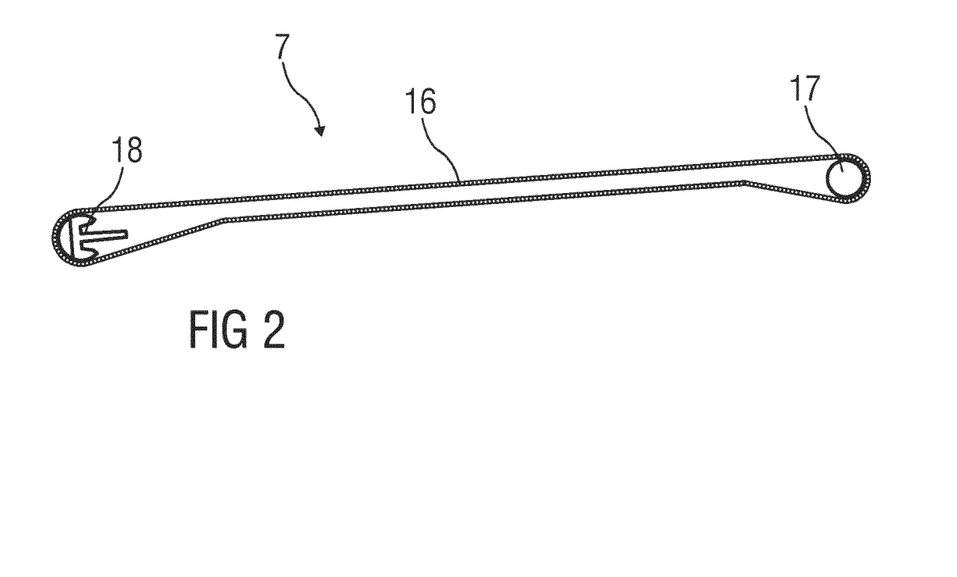
FIG. 2 shows a conveying drive of an exemplary embodiment of a transport device.

FIG. 2 (FIG. 2) shows the traction mechanism drive of the conveying drive 7. The traction mechanism 16 in this exemplary embodiment is a closed chain having two diverting regions. Arranged in one diverting region is a drive unit 17 by means of which the chain can be driven. Arranged in the other diverting region is a tensioning unit 18 by means of which the chain can be tensioned. Instead of a chain, use may also be made of a belt, cable or the like as a traction mechanism 16.

Figure 3:
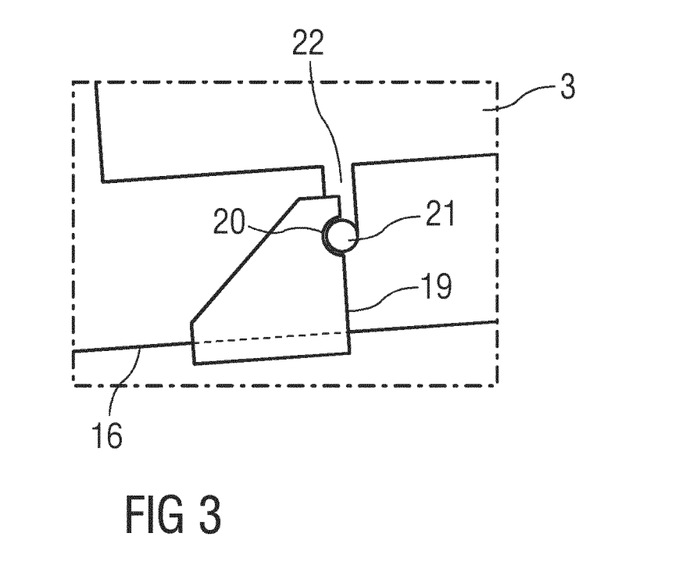
FIG. 3 shows a coupling of a coil carrier to a conveying drive of an exemplary embodiment of a transport device.

FIG. 3 (FIG. 3) shows the coupling of the coil carrier 3 to the traction mechanism 16. Multiple driver elements 19 (not illustrated in FIG. 2) are arranged, so as to be mutually spaced, on the traction mechanism 16. Each driver element 19 has a recess 20. The coil carrier 3 has a coupling element 21 which is arranged on a bracket 22 on an underside of the coil carrier 3 and which engages into the recess 20 of a driver element 19 in order to couple the coil carrier 3 to the traction mechanism 16. The coupling element 21 is, for example, a rod that projects from the bracket 22 toward the traction mechanism 16.

Figure 4:
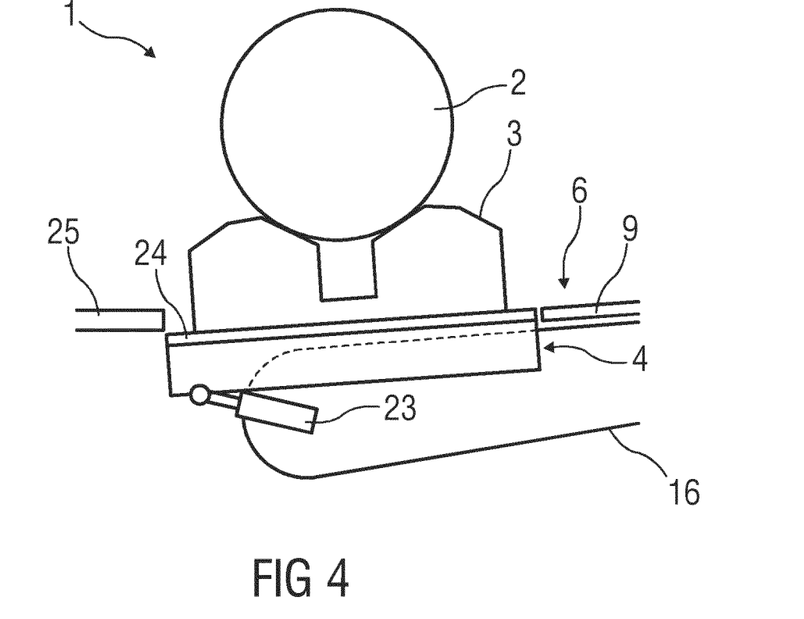
FIG. 4 shows an exemplary embodiment of a transport device in the region of a first conveying station.
Figure 5:
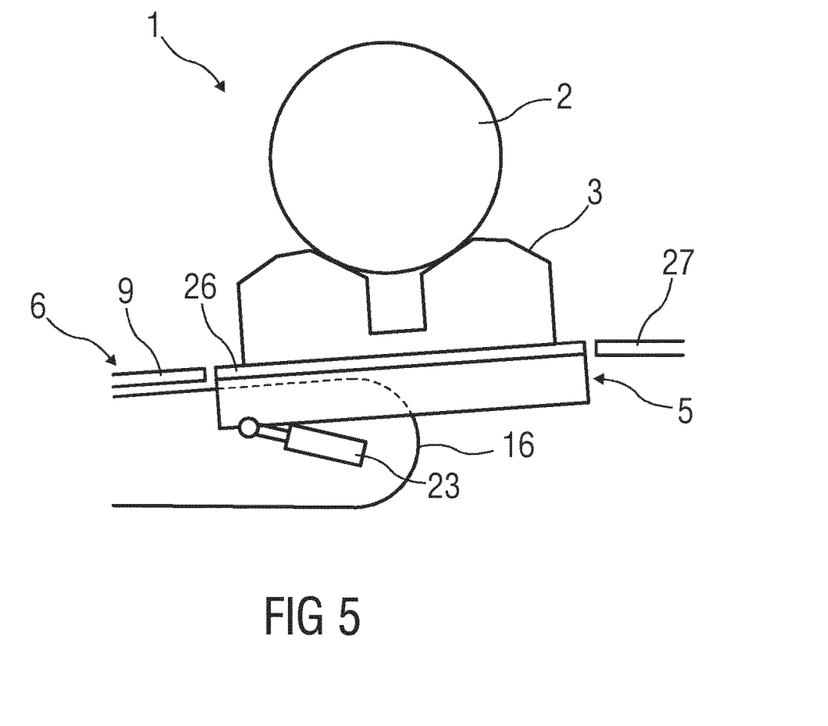
FIG. 5 shows an exemplary embodiment of a transport device in the region of a second conveying station.

FIGS. 4 and 5 (FIG. 4 and FIG. 5) show the transport device 1, in each case in the region of one of the conveying stations 4, 5. Each conveying station 4, 5 can be tilted between two end positions by means of a tilting drive 23. The tilting drive 23 is for example a hydraulic drive. In a first end position of a conveying station 4, 5, the conveying station 4, 5 is oriented horizontally. In the second end position, the conveying station 4, 5 has an inclination corresponding to the gradient of the conveying track 6 and adjoins the conveying track 6 such that a coil carrier 3 can be conveyed by the conveying drive 7 from the conveying track 6 into the conveying station 4, 5 and out of the conveying station 4, 5 onto the conveying track 6. In the exemplary embodiment illustrated, a first conveying station 4 is arranged at a lower height level than the second conveying station 5.

FIG. 4 (FIG. 4) shows a side view of the first conveying station 4 in its second end position, wherein a coil carrier 3 that has been loaded with a metal strip coil 2 is received in the conveying station 4. The first conveying station 4 has rails 24 which correspond to the rails 9 of the conveying track 6 and by means of which a coil carrier 3 can be conveyed from the conveying track 6 into the first conveying station 4, and out of the first conveying station 4 onto the conveying track 6, in the second end position of the first conveying station 4. Furthermore, in the first end position of the first conveying station 4, a coil carrier 3 can be moved into the first conveying station 4 and out of the first conveying station 4 via horizontally running rails 25 that lead to the first conveying station 4.

FIG. 5 (FIG. 5) shows a side view of the second conveying station 5 in its second end position, wherein a coil carrier 3 that has been loaded with a metal strip coil 2 is received in the conveying station 5. Analogously to the first conveying station 4, the second conveying station 5 also has rails 26 which correspond to the rails 9 of the conveying track 6 and by means of which a coil carrier 3 can be conveyed from the conveying track 6 into the second conveying station 5, and out of the second conveying station 5 onto the conveying track 6, in the second end position of the second conveying station 5. Furthermore, in the first end position of the second conveying station 5, a coil carrier 3 can be moved into the second conveying station 5 and out of the second conveying station 5 via horizontally running rails 27 that lead to the second conveying station 5.

Furthermore, each conveying station 4, 5 has an arresting mechanism 28 by means of which a coil carrier 3 can be arrested in the conveying station 4, 5. The arresting mechanism 28 will be described on the basis of FIGS. 6 and 7 for the first conveying station 4. The second conveying station 5 has an analogous arresting mechanism 28.

Figure 6:
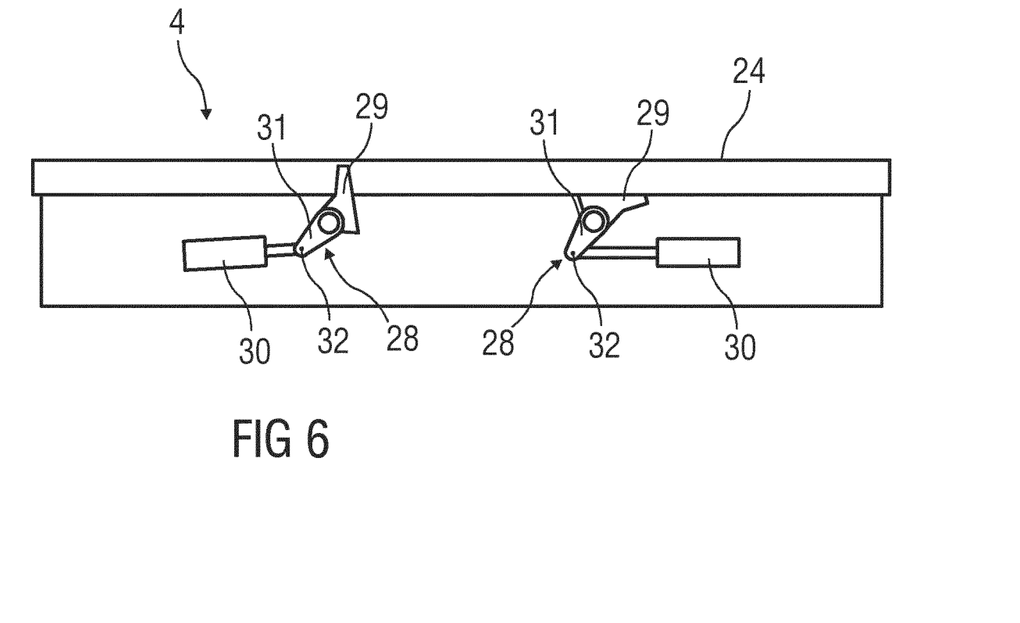
FIG. 6 shows a side view of the first conveying station shown in FIG. 4, with an open housing.

FIG. 6 (FIG. 6) shows a side view of the first conveying station 4 with an open housing.

Figure 7:
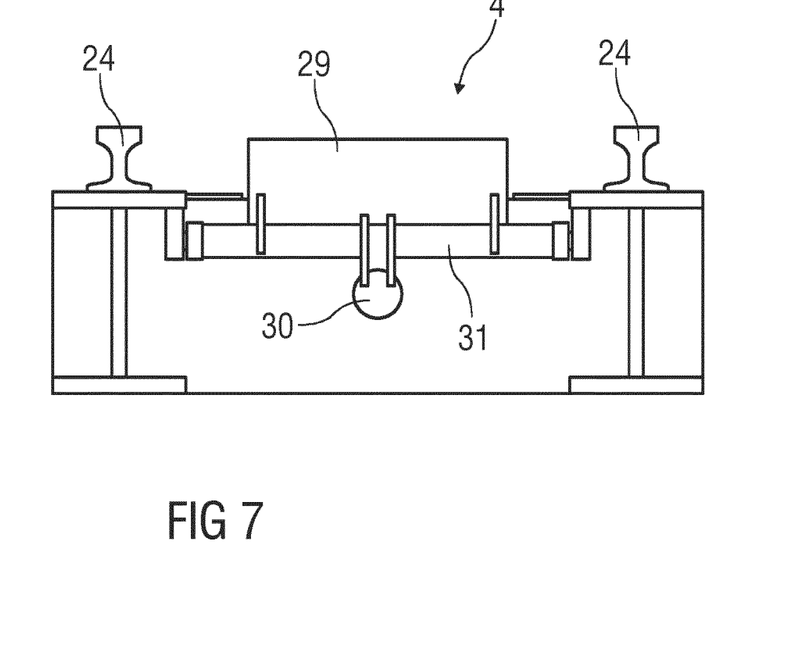
FIG. 7 shows a rear view of the first conveying station shown in FIG. 4, with an open housing.

FIG. 7 (FIG. 7) shows a rear view of the first conveying station 4 with an open housing.

The arresting mechanism 28 has two arresting elements 29, which can each be pivoted between two pivoting positions. In a first pivoting position, an arresting element 29 is decoupled from a coil carrier 3 that is received in the first conveying station 4. In the second pivoting position, the arresting element 29 is set against the coil carrier 3, for example against the coupling element 21 and/or the bracket 22 of the coil carrier 3. For each arresting element 29, the arresting mechanism 28 has a pivoting drive 30 by which the arresting element 29 can be pivoted between the two pivoting positions by way of a lever element 31 which is fixedly connected to the arresting element 29 and which is coupled to the pivoting drive 30 via a joint 32.

The pivoting drives 30 are for example each designed as hydraulic drives. Each arresting element 29 is of flap-like design and is pivoted down in the first pivoting position and pivoted up in the second pivoting position. In FIG. 6, the right-hand arresting element 29 is illustrated in the first pivoting position and the left-hand arresting element 29 is illustrated in the second pivoting position. In FIG. 7, an arresting element 29 is illustrated in the second pivoting position. In other exemplary embodiments, the arresting mechanism 28 may have only one arresting element 29 rather than two arresting elements 29.

Figure 8:
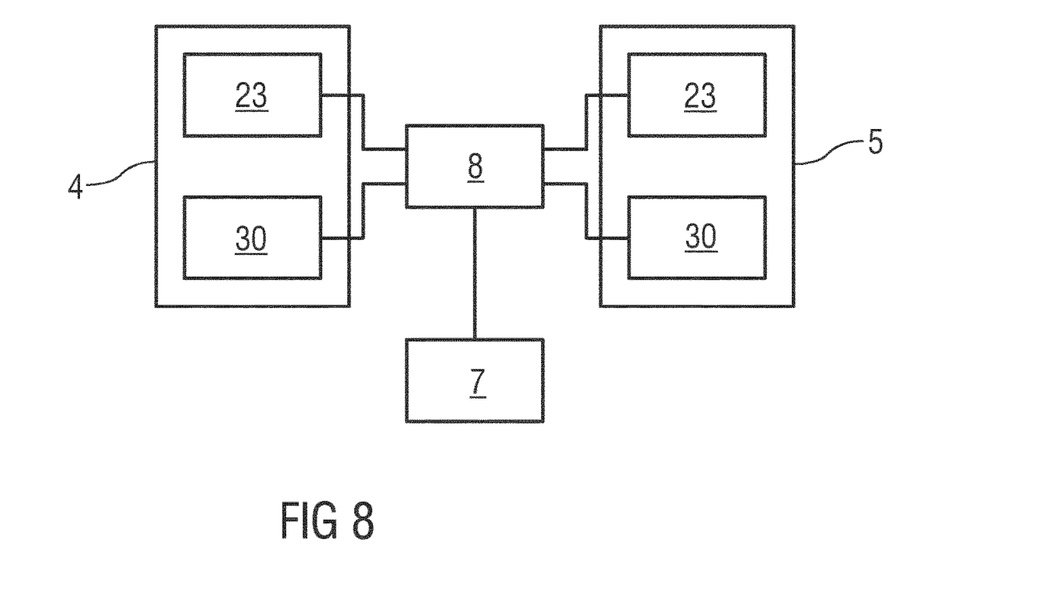
FIG. 8 shows a block diagram of a controller of an exemplary embodiment of a transport device.

FIG. 8 (FIG. 8) shows a block diagram of the controller of the transport device 1. The controller has the control unit 8. The control unit 8 is configured to control the conveying drive 7 of the conveying track 6, the tilting drives 23 of the conveying stations 4, 5, and the pivoting drives 30 of the arresting elements 29 of the conveying stations 4, 5. The control unit 8 controls and coordinates the tilting of the conveying stations 4, 5, the arresting of coil carriers 3 in the conveying stations 4, 5, the coupling of coil carriers 3 to the traction mechanism 16 or of an engagement element 34, which is arranged on the coil carrier, to a support element 33, the decoupling of coil carriers 3 from the traction mechanism 16, and the conveyance of coil carriers 3 on the conveying track 6 and between the conveying track 6 and the conveying stations 4, 5.

For the transport of a metal strip coil by means of the transport device 1, a coil carrier 3 is firstly loaded with the metal strip coil 2. The loaded coil carrier 3 is moved on the rails 25 to the first conveying station 4 and received by the first conveying station 4 in the first end position of said first conveying station. Then, in the first end position of the first conveying station 4, the loaded coil carrier 3 is arrested in the first conveying station 4 by means of the arresting mechanism 28 of the first conveying station 4. The first conveying station 4 is subsequently tilted by means of its tilting drive 23 into the second end position. By virtue of the first conveying station 4 being tilted into the second end position, the coupling element 21 of the coil carrier 3 is moved toward the traction mechanism 16 of the conveying track 6, or the engagement element 34 arranged on the coil carrier 3 is placed in interlocking operative connection with the support element 33. By virtue of the traction mechanism 16 being driven, the coupling element 21 is coupled to the traction mechanism 16 by being placed in engagement with the recess 20 of a driver element 19. After the coil carrier 3 is coupled to the traction mechanism 16, the arresting of the coil carrier 3 in the first conveying station 4 is released. The loaded coil carrier 3 is subsequently conveyed by means of the conveying drive 7 out of the first conveying station 4 onto the conveying track 6 and, on the conveying track 6, to the second conveying station 5. Before the loaded coil carrier 3 reaches the second conveying station 5, the second conveying station 5 is tilted into its second end position, whereby an operative connection between an engagement element 34 and a support element 33 is—if present—also released. The loaded coil carrier 3 is conveyed by the conveying drive 7 into the second conveying station 5 and is arrested in the second conveying station 5 by the arresting mechanism 28 thereof. The coil carrier 3 is subsequently decoupled from the traction mechanism 16—if present—by virtue of the traction mechanism 16 being moved backward slightly such that the driver element 19, which was previously coupled to the coupling element 21, is decoupled from the coupling element 21. After the coil carrier 3 has been decoupled from the traction mechanism 16, the second conveying station 5 with the loaded coil carrier 3 is tilted into the first end position. The arresting of the coil carrier 3 in the second conveying station 5 is subsequently released, and the loaded coil carrier 3 is moved out of the second conveying station 5 on the rails 27.

In order to transport a coil carrier 3 from the second conveying station 5 back to the first conveying station 4 after said coil carrier has been unloaded, the process is reversed. The unloaded coil carrier 3 is moved on the rails 27 to the second conveying station 5 and received by the second conveying station 5 in the first end position of said second conveying station. The coil carrier 3 is then arrested in the second conveying station 5 by means of the arresting mechanism 28 of the second conveying station 5. Subsequently, the second conveying station 5 is tilted into the second end position and the coil carrier 3 is coupled to the traction mechanism 16, or the engagement element 34 is interlockingly operatively connected with the support element 33, analogously to the coupling of a loaded coil carrier 3 to the conveying drive 7 in the first conveying station 4. The arresting of the coil carrier 3 in the second conveying station 5 is thereafter released. Subsequently, the coil carrier 3 is conveyed by means of the conveying drive 7 out of the second conveying station 5 onto the conveying track 6, is conveyed on the conveying track 6 to the first conveying station 4, and is conveyed from the conveying track 6 into the first conveying station 4, which has been tilted into its second end position. The coil carrier 3 is then arrested in the first conveying station 4 and is decoupled from the traction mechanism 16—if present-analogously to the decoupling of a loaded coil carrier 3 from the traction mechanism 16 in the second conveying station 5. The first conveying station 4 with the coil carrier 3 is thereafter tilted into the first end position, wherein, if necessary, an operative connection between the engagement element 34 and the support element 33 is in turn released. The arresting of the coil carrier 3 in the first conveying station 4 is subsequently released, and the coil carrier 3 is moved out of the first conveying station 4 on the rails 25.

Whilst a first coil carrier 3 that has been loaded with a metal strip coil 2 is being conveyed on the conveying track 6 from the first conveying station 4 to the second conveying station 5, the first conveying station 4 can be tilted back into its first end position, and a second coil carrier 3 that has been loaded with a metal strip coil 2 can be moved into the first conveying station 4. Said second loaded coil carrier 3 can then likewise be conveyed on the conveying track 6 whilst the first loaded coil carrier 3 is still being conveyed. In this way, multiple loaded coil carriers 3 can be conveyed simultaneously on the conveying track 6.

Figure 9:
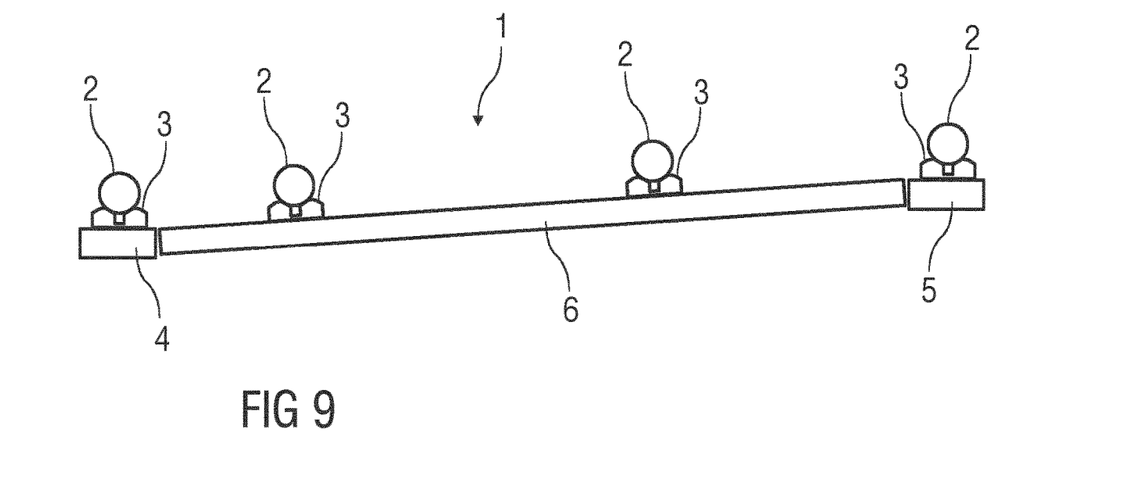
FIG. 9 shows an exemplary embodiment of a transport device during the simultaneous conveyance of multiple loaded coil carriers.

FIG. 9 (FIG. 9) shows a transport device 1 during the simultaneous conveyance of multiple loaded coil carriers 3.

Analogously to this, it is also possible for multiple unloaded coil carriers 3 to be conveyed simultaneously on the conveying track 6 from the second conveying station 5 to the first conveying station 4.

LIST OF REFERENCE DESIGNATIONS

1 Transport device
2 Metal strip coil
3 Coil carrier
4 First conveying station
5 Second conveying station
6 Conveying track
7 Conveying drive
8 Control unit
9 Rail
10 Wheel
11, 12 Bearing surface
13 Outer surface
14 Coil axis
15 Transport direction
16 Traction mechanism
17 Drive unit
18 Tensioning unit
19 Driver element
20 Recess
21 Coupling element
22 Bracket
23 Tilting drive
24 to 27 Rail
28 Arresting mechanism
29 Arresting element
30 Pivoting drive
31 Lever element
32 Joint
33 Support element
34 Engagement element

The invention claimed is:

1. A transport device for transporting metal strip coils, comprising:
 at least one coil carrier configured to carry a metal strip coil;
 two conveying stations arranged at mutually different heights and each configured to receive a coil carrier;
 a conveying track running between the two conveying stations; and
 a conveying drive configured to convey the at least one coil carrier on the conveying track between the conveying stations;
 wherein each conveying station can be tilted between a first end position, wherein the conveying station is oriented horizontally, and a second end position, wherein the conveying station has an inclination substantially co-linear to a gradient of the conveying track and adjoins the conveying track such that the coil carrier can be conveyed by the conveying drive from the conveying track into the conveying station and out of the conveying station onto the conveying track.

2. The transport device as claimed in claim 1, wherein each conveying station has a tilting drive for tilting the conveying station between the first end position and the second end position.

3. The transport device as claimed in claim 1, wherein each conveying station has an arresting mechanism configured to arrest the coil carrier in the conveying station.

4. The transport device as claimed in claim 3, wherein each arresting mechanism has at least one arresting element pivotable between two pivoting positions, in a first pivoting position the arresting mechanism being decoupled from the coil carrier received in the conveying station, and in a second pivoting position the arresting mechanism being set against the coil carrier.

5. The transport device as claimed in claim 4, wherein each arresting mechanism has, for each arresting element, a pivoting drive configured to pivot the arresting element between the two pivoting positions.

6. A transport device for transporting metal strip coils, comprising:
 at least one coil carrier configured to carry a metal strip coil;
 two conveying stations arranged at mutually different heights and each configured to receive a coil carrier;
 a conveying track running between the two conveying stations; and
 a conveying drive configured to convey the at least one coil carrier on the conveying track between the conveying stations;
 wherein each conveying station can be tilted between a first end position, wherein the conveying station is oriented horizontally, and a second end position, wherein the conveying station has an inclination corresponding to a gradient of the conveying track and adjoins the conveying track such that the coil carrier can be conveyed by the conveying drive from the conveying track into the conveying station and out of the conveying station onto the conveying track; and
 wherein the conveying drive has a traction mechanism drive having a traction mechanism that runs along the conveying track, and each coil carrier can be coupled to the traction mechanism.

7. The transport device as claimed in claim 6, wherein the traction mechanism has at least one driver element, and each coil carrier has a coupling element which can be coupled to a driver element of the traction mechanism.

8. The transport device as claimed in claim 7, wherein each driver element has a recess for a coupling element of a coil carrier, and the coupling element of the coil carrier is received in the recess of the driver element when the coupling element is coupled to the traction mechanism.

9. The transport device as claimed in claim 1, wherein the conveying drive has a support element which runs along the conveying track and to which the coil carrier can be coupled by means of at least one engagement element that is arranged on the coil carrier.

10. The transport device as claimed in claim 9, wherein:
 the support element is designed as a pin rack or as a toothed rack;
 the engagement element is in a form of a toothed gear; and each coil carrier has at least one drive device for the at least one engagement element.

11. The transport device as claimed in claim 1, wherein each coil carrier is configured to carry a metal strip coil such that, during the transport on the conveying track, a coil axis of the metal strip coil is oriented horizontally and perpendicularly with respect to a transport direction of the transport.

12. The transport device as claimed in claim 1, wherein each coil carrier has two mutually spaced bearing surfaces, which are inclined with respect to one another, for a circumferential outer surface of a metal strip coil.

13. The transport device as claimed in claim 1, wherein the conveying track and the conveying stations have mutually corresponding rails, and each coil carrier has wheels corresponding to the rails.

14. The transport device as claimed in claim 1, wherein each coil carrier has a brake for braking a movement of the coil carrier.

15. The transport device as claimed in claim 1, further comprising a control unit configured to control the tilting of the conveying stations and to control the conveying drive.

16. A method for operating a transport device for transporting metal strip coils, the transport device comprising:
   at least one coil carrier configured to carry a metal strip coil;
   a first conveying station and a second conveying station arranged at mutually different heights and each configured to receive a coil carrier;
   a conveying track running between the first and second conveying stations; and
   a conveying drive configured to convey the at least one coil carrier on the conveying track between the first and second conveying stations;
   wherein each conveying station can be tilted between a first end position, wherein the conveying station is oriented horizontally, and a second end position, wherein the conveying station has an inclination substantially co-linear to a gradient of the conveying track and adjoins the conveying track such that the coil carrier can be conveyed by the conveying drive from the conveying track into the conveying station and out of the conveying station onto the conveying track;
   the method comprising:
   loading the coil carrier with the metal strip coil;
   subsequently moving the loaded coil carrier to a first conveying station and receiving the loaded coil carrier by the first conveying station in the first end position of the first conveying station;
   subsequently tilting the first conveying station into the second end position;
   subsequently coupling the loaded coil carrier to the conveying drive and conveying the loaded coil carrier by the conveying drive out of the first conveying station onto the conveying track and, on the conveying track, to the second conveying station;
   subsequently conveying the loaded coil carrier by the conveying drive into the second conveying station, and receiving the loaded coil carrier in the second conveying station, in the second end position of the second conveying station;
   subsequently tilting the second conveying station with the loaded coil carrier into the first end position; and
   subsequently moving the loaded coil carrier out of the second conveying station.

17. The method as claimed in claim 16, wherein the conveying drive has a traction mechanism drive having a traction mechanism that runs along the conveying track, and each coil carrier can be coupled to the traction mechanism.

* * * * *